Aug. 13, 1935.   J. P. GATY   2,011,358
AIRCRAFT MACHINE GUN CAMERA
Filed June 21, 1934   3 Sheets-Sheet 2
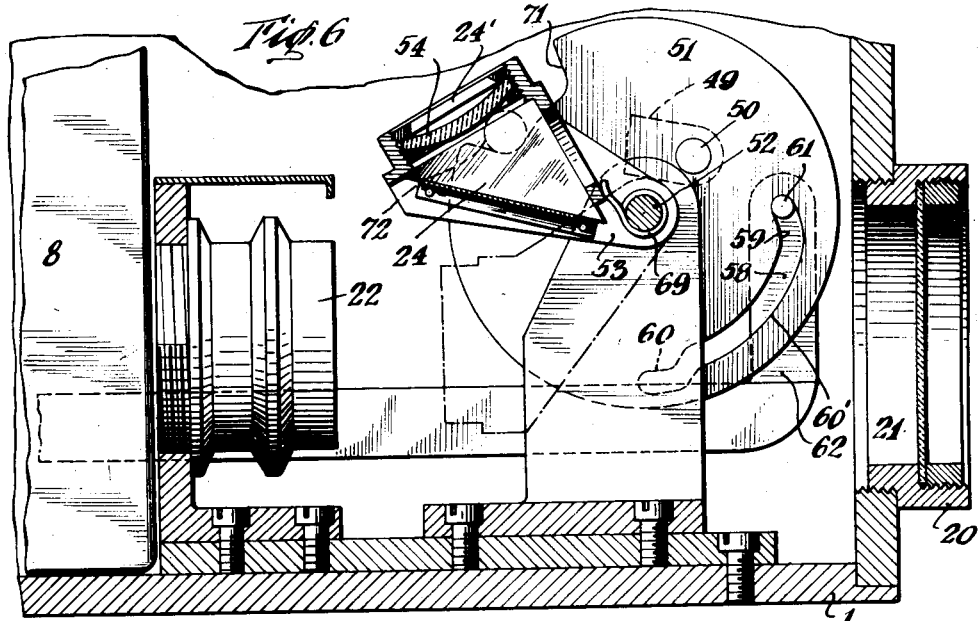
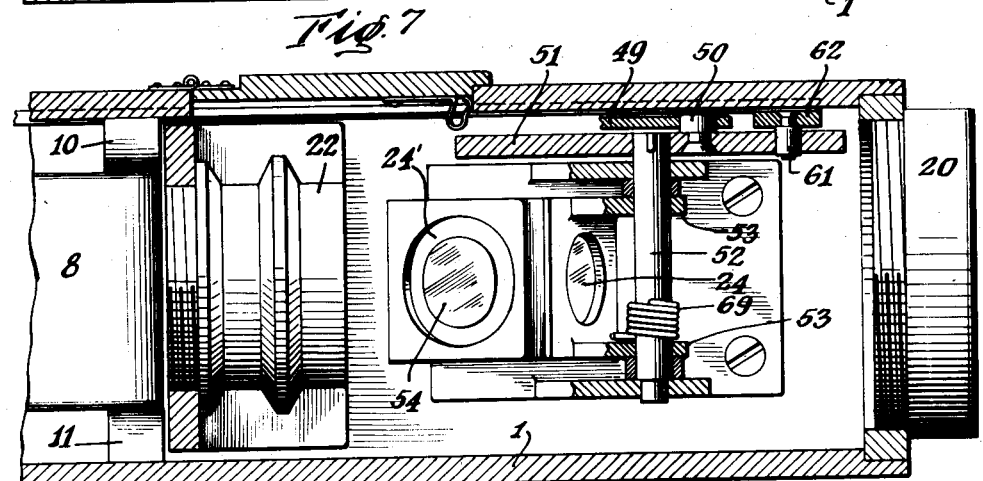
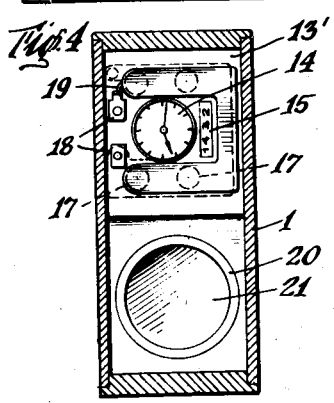
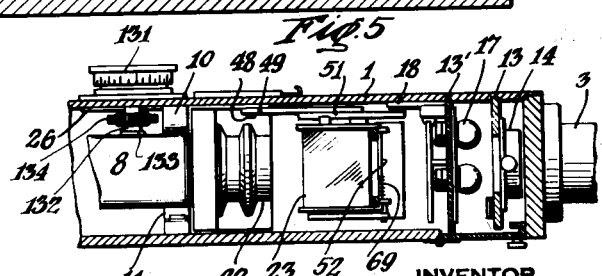
INVENTOR
John P. Gaty
BY
ATTORNEYS Aug. 13, 1935.                J. P. GATY                2,011,358
                       AIRCRAFT MACHINE GUN CAMERA
                    Filed June 21, 1934        3 Sheets-Sheet 3
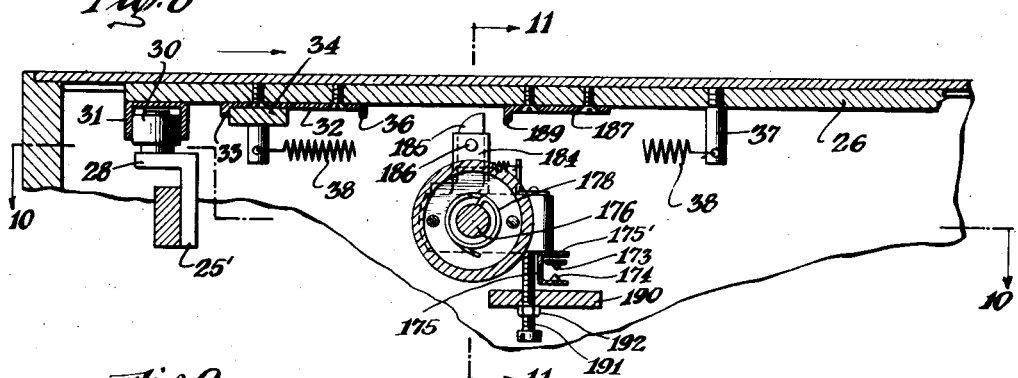
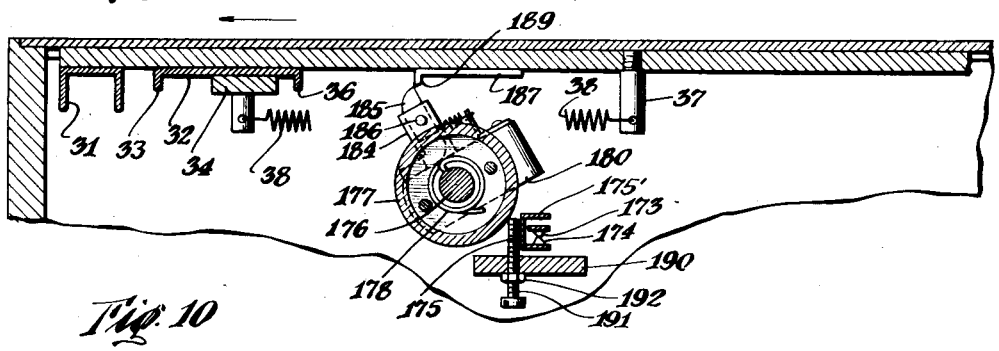
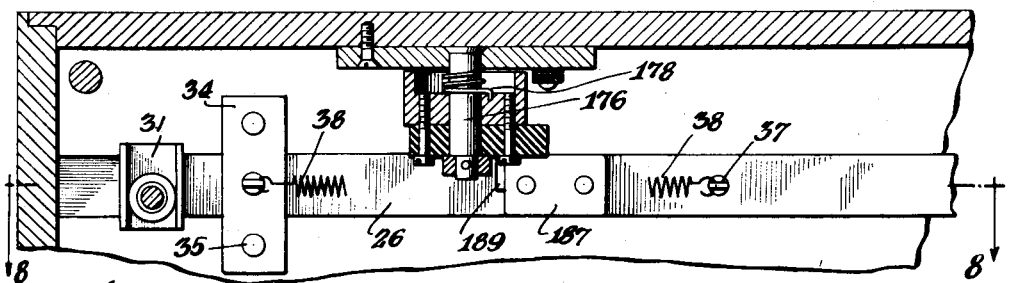
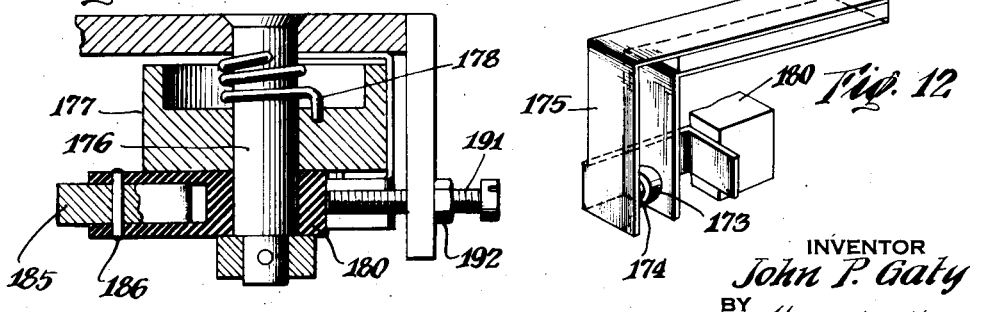
INVENTOR
John P. Gaty
BY
ATTORNEYS Patented Aug. 13, 1935

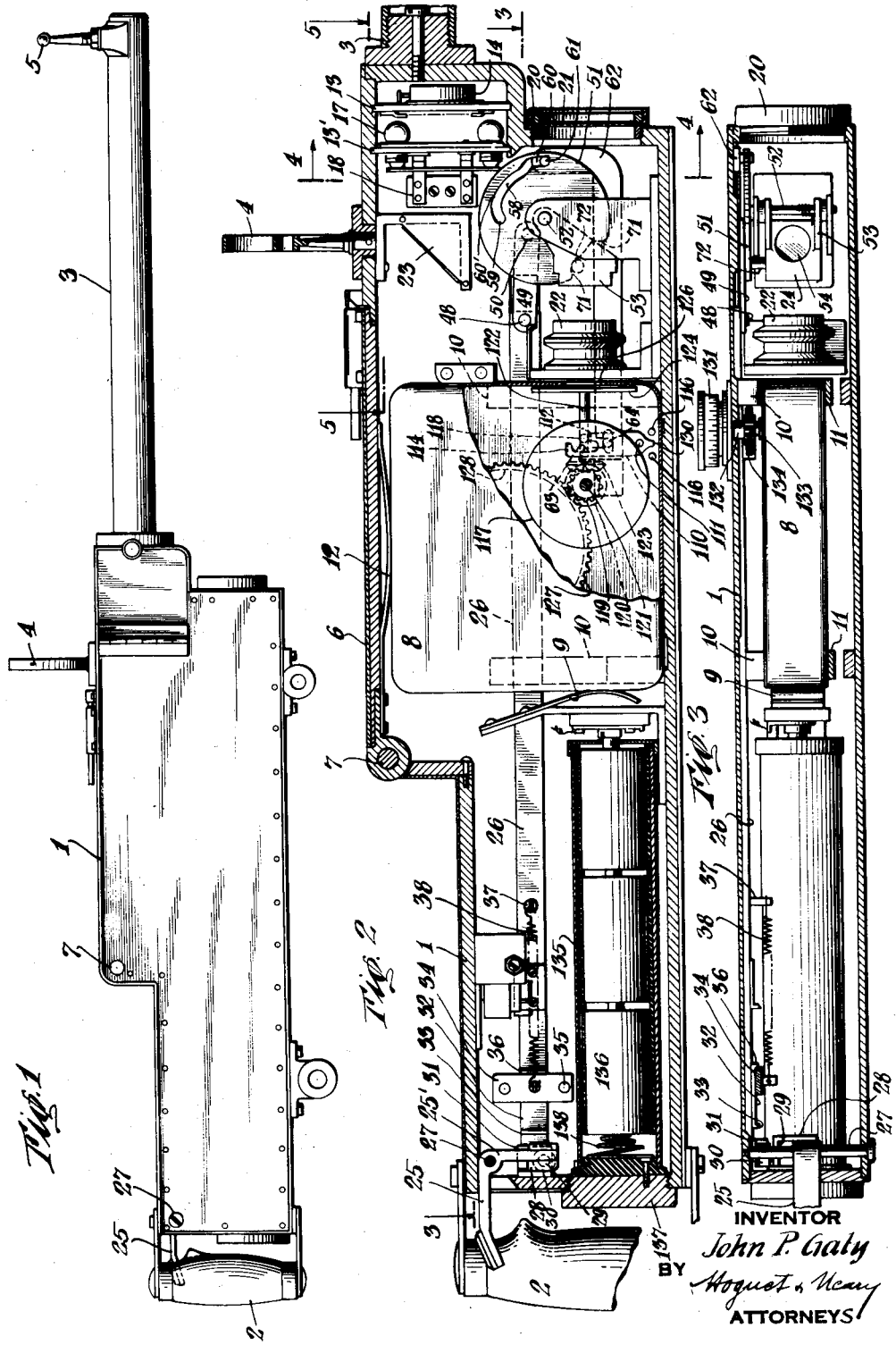

2,011,358

UNITED STATES PATENT OFFICE 2,011,358

AIRCRAFT MACHINE GUN CAMERA

John P. Gaty, Woodside, N. Y., assignor to Fairchild Aerial Camera Corporation, a corporation of New York Application June 21, 1934, Serial No. 731,593

11 Claims. (Cl. 88—16)

This invention is a continuation in part of my application filed May 26, 1933, Serial Number 672,946, for improvements in machine gun camera, and relates in general to photographic cameras and more particularly to that type of camera known in the art as machine gun cameras, that is to say, cameras simulating the form of a machine gun and whereby the accuracy of the manipulation of the machine gun in target practice may be checked by inspection of the pictures taken.

An object of the invention is to provide such a device wherein a single main lens may be utilized for the purpose of photographing both an object at a long distance and a watch at a short distance within the camera, so as to constitute a time record of the exposures taken.

Another object of the invention is to provide suitable filters whereby these two results may be obtained by the use of a single main lens, and to provide means whereby this lens may be focused for long range objects or whereby the focus of the main lens may be corrected by an auxiliary or correction lens and prism introduced into the path of light for accomplishing photographic exposure of objects located within the casing of the camera device.

Another object of the invention is to provide an optical system, simple in nature and inexpensive as to cost, whereby fast lenses of high aperture ratio may be used, so as to increase shutter speeds far beyond those in conventional use, by means of the increase of light transmitting ability.

A still further object of the invention is to use and arrange such a filter, so that it will not act upon the rays of an illuminated watch, a picture of which is to be recorded, but only the rays from the objects at a substantial distance. The purpose of this is to hold back the exposure of objects in the sunlight without making necessary excessive illumination on the watch, which may be photographed at the same lens opening or aperture and at the same shutter speed as the object in sunlight.

A still further object is to provide such a device as to consist of a removable self-contained moving picture camera unit and a removable watch unit both of which will be readily installed and removable from the device in their proper relation without necessity for adjustment. In this connection, an object of the invention is to provide a novel and efficient means of manual adjustment of the optical system, including light reflecting prisms, a main lens and a correction lens.

A still further and important object of the invention is the provision and pre-arrangement of the operating parts of the device, whereby a definite sequence of operation is predetermined so as to allow for the taking of any desired number of pictures and an exposure on one of said pictures of a record of the time of day as well as the serial number of the series of pictures taken, this to be effected by the mere manual operation of a conventional shutter tripping device.

With the foregoing and other objects in view, the invention consists in the combination of parts and in the details of construction hereinafter set forth in the following specification and appended claims, certain embodiments thereof being illustrated in the accompanying drawings, in which:

Figure 1 is a side elevation of the device;

Figure 2 is a view similar to Figure 1 with one of the side walls of the casing removed;

Figure 3 is a view in longitudinal section taken along line 3—3 of Figure 2;

Figure 4 is a view in section taken along line 4—4 of Figure 2;

Figure 5 is a view in section taken along line 5—5 of Figure 2;

Figure 6 is an enlarged detailed view of a portion of the device showing the operating means for the movement of the correction lens and prism and showing in full lines the device in position for taking a series of pictures of long range objects, and in dotted lines the positions the prism and correction lens assume for taking pictures of the watch within the casing;

Figure 7 is a view taken at right angles to Figure 6 showing a top view of the same.

Figure 8 is an enlarged detailed section similar to Figure 3 and taken along line 8—8 of Figure 10 showing the lighting switch in its inoperative position with its contacts open;

Figure 9 is a view similar to Figure 8 showing the lighting switch in its operative position with its contacts closed;

Figure 10 is a view in section taken along line 10—10 of Figure 8;

Figure 11 is a view in section taken along line 11—11 of Figure 8;

Figure 12 is a detailed enlarged view in perspective of the spring contact member of the lighting switch.

Referring more particularly to the drawings, the device consists of a main casing 1, in which the operative parts of the mechanism are enclosed, a pair of handles 2, by means of which the device may be pointed in the desired direction, a gun barrel 3, and a conventional ring-sight consisting of the usual elements 4 and 5 to simulate the appearance of a machine gun as used particularly on aircraft.

The main casing is provided in its upper wall with a door 6, hinged at 7, through which a removable self-contained standard moving picture camera unit 8 may be inserted and which, when inserted, is self-aligned in its proper predetermined position, by means of longitudinally acting leaf spring 9, side springs 11 and guideways 10, and furthermore by means of a similar leaf spring 12 carried by the door 6, when the latter is closed after the insertion of the camera unit. A compartment 135 may be provided for batteries 136 removably held in place by the screw knob 137 and resiliently kept in place by the compression spring 138.

The casing is also provided with a slot and guide for the insertion of a watch unit, which comprises a slide 13, carrying a watch 14, a counter 15, and a setting device or a data card in place of the counter, and a slide 13' for carrying a series of lamp bulbs 17 with contact devices 18, lead wires 19, this electrical unit being suitably connected to the wiring circuit of the device for predetermined illumination of the lamp bulbs when it is desired to take a photographic exposure of the watch and the counter. The counter may be set by a hand knob 131 on a shaft 132 carrying a gear 133, meshing with a gear 134, which may indirectly operate the counter.

The device further consists of a light aperture 20 and a filter device 21, constituting the only means for admission of outside light for the taking of pictures of objects external to the device, while the lamp bulbs constitute the means of illumination of the watch, for taking pictures of the latter. A single main photographic lens is employed for these two operations and is shown at 22. There is also provided in the optical system a stationary prism 23 and a movable prism 24, which latter is adapted to be moved in conjunction with a correction lens which it carries so as to be out of the path of the light rays utilized by the lens to photograph the external object and to be moved into said path and in proper position for permitting the taking of the picture of the watch which is on a higher plane than the cone of light passing through the lens from the external source. This movable prism 24 has arranged in its face a diaphragm 24' near the correction lens, this diaphragm being of the form indicated in Figure 6.

In accomplishing these two operations, the mechanism involved briefly consists of a trigger 25 adjacent the spade grip handles, and a long operating bar 26, which, through other actuating elements, is adapted to elevate the prism and correction lens when it is desired to take a picture of an external object upon the forward movement of the operating bar, and upon the return movement of the operating bar to cause the prism and correction lens to be lowered and also cause the lamps to be illuminated, for the purpose of taking a photographic exposure of the watch.

In considering the sequence of operation of the operating elements throughout the entire cycle as well as the photographic results obtained thereby it should be borne in mind that the single photographic lens is stationary and that a correction lens is employed in conjunction with the movable prism, the movable prism and correction lens moving as a unit.

When the operator desires to take a series of pictures of external objects, all that is required to do is to press downwardly upon the lever 25, which is pivotally connected to the casing by means of a shaft 27. The trigger lever is provided with an integral downward extension 25', which is secured to a bracket 28 having an extension 29, about which is arranged a roller 30 mounted in a channel 31 carried by the bar 26. The flat operating bar 26 carries a plate 32 adapted to slide under a bracket 34 secured at 35 to the casing but formed with lugs 33 and 36 which by their abutment against either side of the bracket act respectively as limiting stops for the forward and rearward movement of the bar 26. The bar 26 also carries a post 37, there being secured thereto and to the plate 34 a tension spring 38.

Referring to Figures 2 and 6, the operating bar 26 extends forwardly and is adapted for reciprocatory motion, and at its forward end is pivotally attached, at 48, to a link 49, which latter is eccentrically pivotally connected at 50 to a disc 51, concentrically mounted on a shaft 52, so as to be rotatable therewith. Mounted loosely on the shaft 52 is a block 53 carrying prism 24 and a correction lens 54 so that the prism and correction lens may be moved out of the way for taking a series of pictures of long range objects when in the position shown in full lines in Figure 6, and also later assume the position shown in Figure 2 and in dotted lines in Figure 6 for taking a single exposure of the watch by reflection through means of the stationary prism 23. The operation of the trigger and the consequent operation of the operating bar 26 in rotating the disc 51 transmits this rotary movement to the block 53 through the medium of the pin 72 which engages with the end of the recess 71, in the disc 51, and is fastened in block 53. The disc 51 is also provided with an arcuate slot 58 with eccentric extensions 59 and 60 to receive a pin 61.

Pin 61 is fixed to and carried by an angular flat bar 62, which extends rearwardly and is adapted for longitudinal sliding movement and is provided at its rear end with an operating hook 63, adapted to engage a suitable element 64, for setting in motion by any suitable means a standard moving picture camera unit. In other words, the forward and rearward movement of the main operating bar 26 brings about the present described motion of the flat bar 62, in such a manner that at a certain predetermined point in the forward movement of the operating bar 26 through the medium of the flat bar 62 the camera mechanism is set into operation so as to take a number of pictures of an exterior object.

A reverse movement of the flat bar 62 is effected so as to again set the camera mechanism into operation, so as to take a single picture of the interiorly located watch; this latter function also taking place at a predetermined point in the return movement of the main operating bar. In order to bring this result about it must be remembered that the forward movement of the main actuating bar 26 causes a rotation of the cam disc 51 in a clockwise direction, and that during this movement the pin 61 rides in the groove 58, and so long as the pin remains in the concentric portion of the groove, no movement is imparted to the camera operating bar 62.

The pin 61 is in the upper extremity of the concentric portion of the groove 58 just below the eccentric portion 59 just after the actuation of the camera for a series of exposures of the exteriorly located object, as the cam disc 51 is being rotated counterclockwise by the return movement of the bar 26 and the pin 61 has been forced out of the upper eccentric groove 59 into the concentric portion 58. After the disc 51 has been rotated further in a counterclockwise direction by a rearward movement of the operating bar 26, pin 61 is just above the lower eccentric portion 60, the lamp bulbs having been illuminated and the prism and correction lens being set in position for taking a single picture of the watch, which occurs as the pin 61 is forced to ride in the eccentric portion 60, as this imparts a movement of the camera operating bar 62 forwardly to bring this about. The pin 61 then rides in the groove extension 60' which is concentric and allows a movement of the light switch to extinguish the lamp bulbs.

As explained before, the main lens is stationary and the movable prism and correction lens are moved into the position shown in dotted lines in Figure 6 when it is time for the exposure of the watch and in the position shown in full lines in Figure 6 when it is time for the exposure of externally located objects. In this connection it is also necessary to synchronize with the operation of the camera mechanism the movement of the movable prism and correction lens so that they will be in proper position for taking pictures of exteriorly located objects and of the internally located watch in a predetermined sequence. To bring this about the movable prism and correction lens are also mounted so as to be rotatable with shaft 52, and the block 53 carrying the prism and correction lens is provided with a coil spring 69 wound around the shaft and bearing against the prism. This tends to force the prism and correction lens to a downward position which occurs, and is brought about through mechanism about to be described, when it is desired to take a single exposure of the watch.

To bring about the rotation of the prism, the disc 51 is also provided with a peripheral recess 71, in which it is adapted to ride a pin 72 fixedly secured to the movable prism. It will also be seen by reference to Figure 6 that as the disc 51 is rotated in a clockwise direction, by means of a forward movement of the actuating bar 26, the pin 72 will abut against the lower extremity of the recess 71, in such a manner that the prism will be also rotated in a clockwise direction. This has the effect of raising the prism from its lower position to a higher position so that it will be out of the path of the light rays, so as to make it possible to take long range pictures. Upon the return movement of the actuating bar 26, the spring 69 acts to return the prism to its lower position, this action of the spring being controlled by the limits of the recess 71, and the engagement therewith of the pin 72. This movement of the prism takes effect throughout the first 65° of movement and the remaining 25° of movement of the trigger bar has no effect towards moving the prism, as it is already in its full downward position. The recess 71 is therefore of substantial elongated form so as to allow for a certain movement of the disc 51, necessary for the actuation of other elements of the device without moving the prism.

Referring now more particularly to Figures 2, and 8 to 12 inclusive, which illustrate in detail a switch mechanism for illuminating the bulbs for the watch, it must be borne in mind that this illumination of the watch occurs near the end of the return travel of the trigger bar 26. The switch may consist of a pair of opposed contacts 173 and 174, the former being carried by the casing so as to be stationary, and the latter carried by a spring element 175' tending to urge the contact 174 into engagement with the contact 173.

Also carried by the casing and loosely mounted on a shaft 176 is a rotatable element 177 normally urged in a clockwise direction by means of a spring 178 fixed to the shaft 176. This rotatable element is also provided with an abutment portion 180 which is adapted to contact with the upper portion 175' of the spring 175, and by reference to Figure 8 it will be seen that a downward pressure on the spring 175 causes the contacts 173 and 174 to be disengaged and consequently the lamp lighting circuit, (not shown) of which they form a part, keeping the circuit open. In this connection it might be stated that the preferable source of electrical energy for lighting lamps is a series of batteries 136, spring pressed by a spring 138 within the casing which may be inserted therein and kept there by a suitable screw knob 137, as shown in Figure 2.

Referring now again to Figures 8 and 9, the element 177 also comprises an extension 184 in the form of a slide to receive an element 185, pivoted at 186, which may also be in the form of a spring plunger, if desired.

The actuating bar 26 carries an operating bracket 187, the bracket being formed with outwardly depending bevelled edge 189, which is adapted for engagement with the member 185. It will be seen that a movement of the bracket 187, from the position to the left of the element 185 to the relative position shown in Figure 8, would cause no actuation or rotation of the assembly 177, inasmuch as the bevelled edge 189 would merely ride over element 185. Upon a return movement, however, of the actuating bar 26, the straight edge of the downward portion of the bracket 187 engages with the said edge of the member 185, as shown in Figure 9, so as to release the spring 175 from the downward pressure of the block 180 under the force of the spring 178, so as to allow the spring 175 to urge the movable contact 174 into engagement with the stationary contact 173 for the purpose of closing the circuit for illuminating the bulbs. This occurs after the expiration of 30° of the return travel of the trigger lever and continues for 50° until after which the lamp circuit is again open for the remaining 13°. In order to bring this result about it will be seen by reference to Figure 9 that a further return movement of the bracket 187 to the left will result in the element 185 being freed from engagement with the bracket 187, after which time the spring 178 again rotates the assembly 177 clockwise, this resulting in the block 180 forcing the contact 174 out of engagement with stationary contact 173 against the action of spring 175. For purpose of adjustment of the movable block 180 with respect to the spring actuated contacts, there may be secured to the casing a stationary block 190, with an adjustment screw 191, and nut 192, to limit the degree of clockwise rotation of the block 180.

It will be appreciated that without the inertia effect of such an arrangement provided by the assembly 177, a sudden and a gradual return of the trigger bar 26 would cause different time intervals of the illumination of the lamps with an ordinary switch arrangement. For the purpose of insuring an ample duration of illumination, therefore, the assembly 177 is employed and the arrangement described makes for a slow and gradual movement thereof so as to provide for a definite time interval from the instant that bracket 189 rides over and releases member 185 until block 180 returns and forces contact 174 out of engagement with contact 173 to open the circuit and extinguish the lamps. This action is uniform even when the trigger is released suddenly.

Thus it will be seen that there has been provided a device in which all of the apparatus for effecting an alteration of the light path is placed back of the filter, which latter also serves the additional useful purpose of screening the mechanism from dust and moisture.

It will also be seen that there has been provided a novel and efficient method of regulating the amount of light passed from the watch to the lens without any necessity for adjustment of the watch, or an adjustment of the illumination thereof.

The entire device having been properly adjusted, it is only necessary to press downwardly upon the manual trigger element 25 to initiate a complete cycle of operation of the device that results in the taking of a series of pictures of long range objects, and the last frame of each of said series having exposed thereon a picture of the watch and the serial number indicator of the series. The sequence of operation of the various parts of the device and the results obtained are best understood while referring to the various figures showing the operating mechanism.

The shutter operating mechanism may be of any standard conventional type in conjunction with the camera unit 8 which is provided with a suitable exposure aperture 126. The element 64 above referred to as an operating pin may be carried by a member 110 pivoted at 111. The lower part 130 of member 110 moves between stops 116 on the casing limiting the extent of movement of member 110 in either direction. The shutter 124 provided with a suitable shutter opening is driven by shaft 122 carrying a bevel gear 123 meshing with a bevel gear 120 carried by a shaft 121 which also carries a latch disc 117 and a gear 119 meshing with a larger gear 127 which when it meshes with gear 119 transmits power from a suitable spring drum 128 carried by a suitable shaft. The drum carries the gear 127 which when it meshes with gear 119 transmits the power from the drum to the shutter. The member 110 acts as a latch by contacting of forks 112 and 114 with a stop 118 carried by a latch disc. The movement of the spring drum gear 127 is counterclockwise and that of the latch disc 117 clockwise. When the forked member 110 as viewed in Figure 2 is oscillated in a counterclockwise direction about its pivot by a rearward movement of hook 63, the fork 112 is brought out of the path of stop 118 and the shutter is free to be driven by the spring drum for a series of pictures. A reverse rotation of member 110 brings fork 112 into the path of the latch disc pin 118 and further movement disengages fork 112 and allows the disc to make one revolution before the pin strikes the fork 114, thus allowing one revolution of the shutter until the stop 118 engages fork 114. In this manner a single exposure is automatically taken of the watch, after each single or series of exposures of externally located objects.

In summary, the forward movement of the trigger bar, initiated by the downward pressure of the trigger element 25, shifts the movable prism and correction lens upwardly out of the path of the light rays and starts the camera mechanism which takes a series of pictures of external objects at long range. The return movement of the main trigger actuating bar follows automatically upon the release of pressure from the trigger and effects the movement of the prism and correction lens into a downward position so as to be in the path of the light rays; closes the light circuit for illuminating the watch face; operates the camera unit to take a single exposure of the watch face when illuminated; and lastly, opening of a lamp lighting circuit so as to constitute a complete cycle of operation. The whole operating system then lies idle until another actuation of the operating lever, at which time a similar cycle of operation is initiated and automatically completed. The optical system shown in the drawings includes a correction lens in connection with the main photographic lens instead of making the latter shiftable, thus reducing the number of working parts considerably.

I claim:

1. In a camera comprising a casing, a shutter and means for tripping the same, a single photographic objective and means aligned therewith for providing a light path for photographic exposure of objects located exteriorly of said casing upon tripping of said shutter, an object located internally of said casing and means for illuminating the same, a light reflecting system including a reflecting member movable into such relationship with said objective as to provide a secondary light path between said internally located object and the axis of said objective, a correction lens to bring said objective into a predetermined focal relationship with said internally located object, means co-ordinating said movement of said reflecting member and the tripping of said shutter for photographically exposing said internally located object.

2. In a camera comprising a casing, a shutter and means for tripping the same, a single photographic objective and means aligned therewith for providing a light path for photographic exposures of objects located exteriorly of said casing upon tripping of said shutter, an object located internally of said casing and means for illuminating the same, a light reflecting system including a reflecting member movable into such relationship with said objective as to provide a secondary light path between said internally located object and the axis of said objective, a correction lens to bring said objective into a predetermined focal relationship with said internally located object, means co-ordinating said movement of said reflecting member and the tripping of said shutter for photographically exposing said internally located object, and control means for bringing about the movements of said reflecting member and the tripping of said shutter in a predetermined sequence.

3. In a camera comprising a casing, an object located within said casing and means for illuminating the same, a shutter, an optical system including a main photographic objective, a movable reflecting prism, and a correction lens, means aligned with said main objective for admitting light rays from an external source, said prism being movable into a position to reflect light rays caused by the illumination of said object into the main objective axis, means for shifting said prism and correction lens substantially simultaneously into and out of the axis of said main lens, means for tripping said shutter, control means for actuating said shifting and tripping means in a predetermined order with respect to each other for photographic exposure of objects located exteriorly of said casing when said prism and correction lens are positioned out of the main lens axis, said control means coordinating said tripping and shifting means with a means for providing artificial light within said casing for illuminating said internally located object and tripping said shutter while said prism and correction lens are positioned in the main lens axis and said internally located object is illuminated for photographic exposure of objects located interiorly of said casing.

4. In a camera comprising a casing, an instrument located within said casing, a shutter, an optical system including a main lens and a correction lens and a movable reflecting prism, means aligned with said main lens for admitting and filtering light rays from an external source, said prism being positioned so as to reflect light rays from said instrument into the main lens axis, means for shifting said prism and correction lens as a unit into and out of the axis of said main lens, means for tripping said shutter, control means for actuating said shifting and tripping means in a predetermined order with respect to each other for photographic exposure of objects located exteriorly of said casing when said prism and correction lens are positioned out of the main lens axis, said control means coordinating said tripping and shifting means with a means for providing artificial light within said casing for illuminating and photographically exposing said instrument when said prism and correction lens are positioned in the main lens axis, said control means including a manually operable trigger bar and a rotary element actuated thereby, means rotatable with said element for causing the shifting of said correction lens and prism to be resiliently effected, said element being provided with a concentric groove with eccentric extensions near either end, said control means having an operating member operatively associated with said groove and during the rotation of said rotary element adapted to be so actuated as to cause the operation of said shutter tripping means to be effected as the eccentric portions are alternately engaged.

5. In a camera comprising a casing, a photographic objective, a photographic film and means for supporting the same, an object within said casing and outside of the normal field of said objective, a shutter between said objective and film, means for tripping said shutter, a movable reflecting prism and correction lens in front of said photographic objective, means for shifting said correction lens and prism as a unit into and out of the axis of said photographic objective for the respective purposes of altering the effective focal length of the photographic objective and of providing a path for light from said internally located object into the field of said photographic objective, and control means adapted to operate the camera shutter and shifting means in a predetermined sequence to take a series of exposures of objects external of the casing while the correction lens and prism are positioned out of the objective axis, and subsequently operate the shifting means to bring the prism and correction lens into a position within the field of the main objective, operate a means to provide illumination for said object located within said casing and actuate said shutter tripping means for photographically exposing said internally located object.

6. In combination, a camera operating mechanism comprising a drive means, a shutter, and means for controlling the same, a main photographic objective, a control means and a correction lens movable into different positions thereby for altering the effective focal length of the main photographic objective, a reflecting prism movable as a unit with said correction lens for introducing into the field of said objective light from a near object in the casing and normally outside the field of said photographic objective and the zone of its sharp focus, and means connected to said shutter control means and to the means for controlling the correction lens and prism for coordinating the action of the shutter with the operation of said correction lens and prism.

7. In a camera comprising a casing, a photographic objective, a photographic film and means for supporting the same, a shutter between said objective and film and means for operating said shutter, an object located within said casing and outside the normal field and sharp focus of said objective, a reflecting prism and correction lens in front of said photographic objective, and means for shifting said prism and correction lens as a unit out of the axis of said photographic objective, means for operating the camera shutter in predetermined order with respect to the movements of said prism and correction lens for the purpose of photographic exposure of objects external of the casing, and for shifting said prism and correction lens into the field of the main objective and means for illuminating said internally located object in predetermined order with said shutter operation and prism and correction lens movement for respectively altering the effective focal length of the photographic objective and of introducing light from said internally located object into the field of said photographic objective for the purpose of photographic exposure of said internally located object.

8. In combination a camera and a casing therefor, a camera operating mechanism comprising a drive means, a shutter, and means for controlling said shutter, a main photographic objective, an object located within said casing and normally out of the axis of said objective, a correction lens and a reflecting prism, means for shifting the same for the respective purposes of altering the effective focal length of the main photographic objective and of moving said prism into the axis of said objective and into such a position as to provide a light path between said main photographic objective and said internally located object, and means for providing illumination for said internally located object in predetermined order with respect to the operation of said shutter and the shifting operations of said prism and correction lens for the purpose of photographic exposure of said internally located object.

9. In a camera comprising a casing, a shutter and means for operating the same, a main photographic objective, means aligned therewith for admitting light, a movable prism and a correction lens, and means for shifting the two as a unit into and out of the axis of said objective, a stationary prism, an object located within the casing, and means for illuminating said internally located object, control means adapted to be manually instigated to bring about in the following predetermined sequence upon each manual instigation the operation of said shifting means to move said prism and correction lens out of the objective axis, the subsequent photographing of externally located objects, the subsequent operations of said illuminating and shifting means for illuminating said internally located object and bringing said movable prism into the axis of said objective and into operative relationship with said stationary prism for forming a light path between the illuminated internally located object and the objective, and simultaneously with this movement of said prism for bringing said correction lens into the objective axis for altering the focal length thereof, the actuation of said shutter tripping means for photographing said internally located object, and the subsequent extinguishing of said illuminating means.

10. In a camera comprising a casing, a shutter, a main photographic objective, means aligned therewith for admitting light, a movable reflecting prism and a correction lens, a stationary reflecting prism, an object located within the casing, control means adapted to be manually instigated to bring about in the following predetermined sequence upon each manual instigation, a movement of said prism and correction lens as a unit out of the objective axis the subsequent photographing of externally located objects, the subsequent illuminating of said internally located object and the bringing of said movable prism into the axis of said objective and into operative relationship with said stationary prism for forming a light path between the internally located illuminated object and the objective, and the bringing of said correction lens into the objective axis for altering the focal length thereof, the photographing of said internally located illuminated object, and the subsequent extinguishing of said illuminating means.

11. In a camera comprising a casing, a single photographic objective and means aligned therewith for admitting light from an external source, an internally located object, a movable reflecting means and a stationary reflecting means, means for establishing an operative relationship between said movable reflecting means and said stationary reflecting means, correction lens and main objective for providing a path for the light rays caused by the illumination of said internally located object into the objective axis, and for correcting the effective focal length of the main objective, and for tripping the shutter while said elements are in this relationship and said internally located object is illuminated, said means being also adapted to bring said main photographic objective, correction lens, and movable reflecting means out of said operative relationship and to bring said main objective into operative focal relationship with said means for admitting light from the exterior of said casing and to trip said shutter while said objective and last named means are so positioned.

JOHN P. GATY.